B. RHODES.

Paper-Barrel and Cylindrical Box.

No. 6,551. Reissued July 20, 1875.

WITNESSES

E. S. Kanner.

M. Chauncey By

B. Rhodes INVENTOR

Nathaniel B. Fragitt.

By Hill Ellsworth.

His Attorneys

UNITED STATES PATENT OFFICE.

BENJAMIN RHODES, OF BOW, ENGLAND, ASSIGNOR, BY MESNE ASSIGNMENTS, TO NATHANIEL B. FUGITT, OF WASHINGTON, D. C.

IMPROVEMENT IN PAPER BARRELS AND CYLINDRICAL BOXES.

Specification forming part of Letters Patent No. 41,351, dated January 19, 1864; reissue No. 6,551, dated July 20, 1875; application filed March 25, 1875.

DIVISION A.

*To all whom it may concern:*

Be it known that BENJAMIN RHODES, of Bow, England, did invent certain new and useful Improvements in the Manufacture of Paper Barrels and Cylindrical Boxes; and I do hereby declare the following to be a full and exact description of the same, reference being had to the accompanying drawings forming part of this specification, in which—

Figure 1:
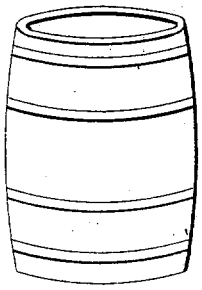
Figure 2:
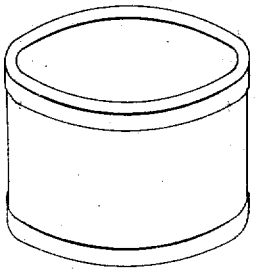
Figure 3:
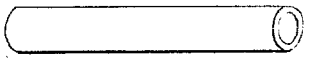
Figure 4:
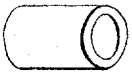
Figure 5:
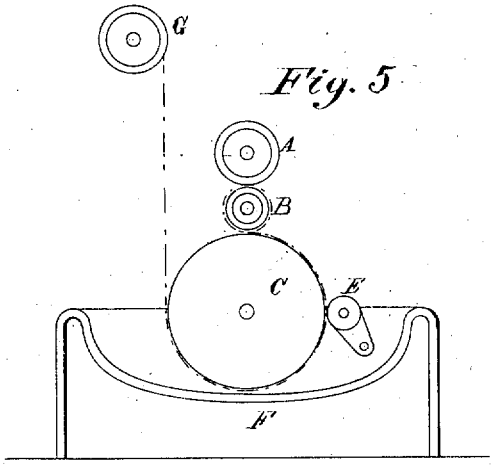
Figure 6:
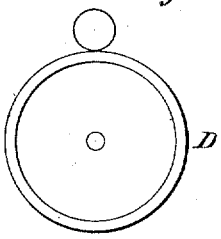
Figure 7:
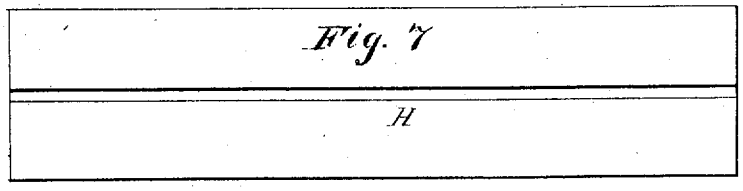
Figure 8:
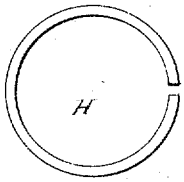
Figure 9:
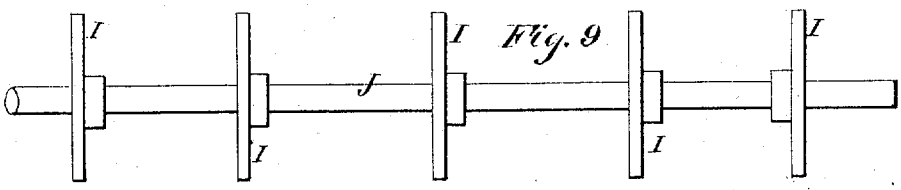

Figure 1 is a perspective view of a cask or barrel constructed in accordance with the invention. Fig. 2 is a similar view of a cylindrical box. Figs. 3 and 4 are perspective views of pipes of different diameters, similarly constructed. Fig. 5 is a vertical cross-section of the apparatus by which said articles are manufactured. Fig. 6 is an end view of the polishing or finishing cylinder. Fig. 7 is a front view of an expanding and contracting mandrel, upon which the cylindrical articles are formed. Fig. 8 is an end view of the same, and Fig. 9 is a view of the supporting-frame of the expanding forming-mandrel.

Similar letters of reference in the accompanying drawings denote the same parts.

The object of this invention, as contained in this division of my application, is to produce for general use cheap and durable barrels, boxes, &c., from paper or paper combined with textile fabrics; and to this end it consists, first, in barrels, cylindrical boxes, &c., composed of paper or paper and textile fabric treated with an adhesive substance, and provided with suitable hoops; secondly, in such articles when the paper is compacted by pressure; thirdly, in such articles when the layers or convolutions are united by an adhesive substance, and compacted by pressure; fourthly, in such articles when the layers are compacted by pressure while they are in a condition to adhere firmly together after being compressed; fifthly, in paper barrels made with a bilge, and provided with suitable hoops; and, sixthly, in the process of forming the articles by means of a mandrel which will contract to permit their removal when formed.

In carrying out the invention I take paper or paper and textile fabric, and coat or otherwise treat it with an adhesive substance, and then wind or wrap it upon a mandrel until the barrel, box, or other article is formed of the required thickness. It is then removed from the mandrel and adapted to the purpose for which it was made. If a barrel, it is provided with suitable hoops. If a box, it may also be provided with hoops, if desired; and if a pipe-section, it may be joined to another pipe-section in any suitable manner.

The different convolutions or layers of paper are compressed and compacted one after the other while the article is being formed, and all are compacted together after it is completed, and before it is removed from the mandrel. The article may also be further treated to harden and polish it; and, if desired, may be coated or covered with a suitable substance, which shall render it proof against moisture and the influence of the weather.

The following arrangement of machinery will be found simple and convenient for forming the various articles.

Such machinery is composed of a smooth pressure-roller, A, which is caused to rotate upon the forming mandrel B, to compress the material wound thereon; and of a large cylinder or roller, C, which revolves in a pan, F. This pan is kept supplied with an adhesive substance for treating the paper or other material, which is brought from a winding-reel, G, down into the pan under the roller C, and thence upward around the latter to the forming-mandrel, upon which it is wound layer upon layer. The pressure-roller A bears down upon each layer as it is wound on the mandrel, compacting it firmly upon the preceding layer, and when a sufficient number of layers have been wound to form the desired article they are all compacted together by the pressure-roller as the mandrel continues to revolve. D is a revolving cylinder or roller to which the article thus formed may be moved by means of a carriage, endless chain, or other suitable contrivance, for the purpose of hardening and finishing it by contact with its revolving surface. E is a gaging-roller arranged in the pan F beside the cylinder C, to free the paper or other material, as it rises from the pan, from superfluous adhesive substance by pressing it against the side of the cylinder. Suitable springs applied to the journals of the gaging-roller serve to hold it up to its work.

In some cases two hollow pressure-cylinders, A, may be employed in contact with the core or mandrel, and a stream of water may be made to flow through one or both to prevent the paper and adhesive substance from sticking to them.

For the purpose of facilitating the removal of the formed articles from the mandrel B the latter is constructed of a sheet-metal cover, H, divided longitudinally so as to expand and slide over a supporting-frame composed of a series of disks, I, mounted centrally upon a shaft, J. After the article has been formed the cover is slipped off the frame, when it will contract and permit the ready removal of the completed article.

After the articles have been formed upon the mandrel they may be covered or coated with a compound or substance that will make them water-proof and capable of resisting injurious atmospheric influences.

I prefer to use bitumen or bituminous mastics or compositions for the purpose, as being the most durable and affording the best protection.

What is claimed as the invention is—

1. As a new article of manufacture, a barre made of paper and an adhesive substance, and provided with suitable hoops.

2. Barrels and boxes made of paper and an adhesive substance, compacted by pressure, and provided with suitable hoops.

3. Wound paper barrels and boxes, the layers of which are united by an adhesive substance, and compacted by pressure.

4. Barrels, the walls of which are built up with layers of paper and compacted by pressure while the layers are in a condition to adhere firmly together after being compressed.

5. Bilged barrels or casks provided with hoops, and having their walls composed of adhesive layers of paper compacted together.

6. The process of forming hollow articles of paper and an adhesive substance by means of a mandrel that will contract to permit their removal when formed.

NATHL. B. FUGITT.

In presence of—
ARTHUR L. MCINTIRE,
WM. C. MCINTIRE.